Feb. 8, 1966   J. J. BEOLETTO   3,233,859
RESILIENT MOUNTING FOR VEHICLE OPERATOR'S SEAT
Filed Nov. 16, 1964   3 Sheets-Sheet 2
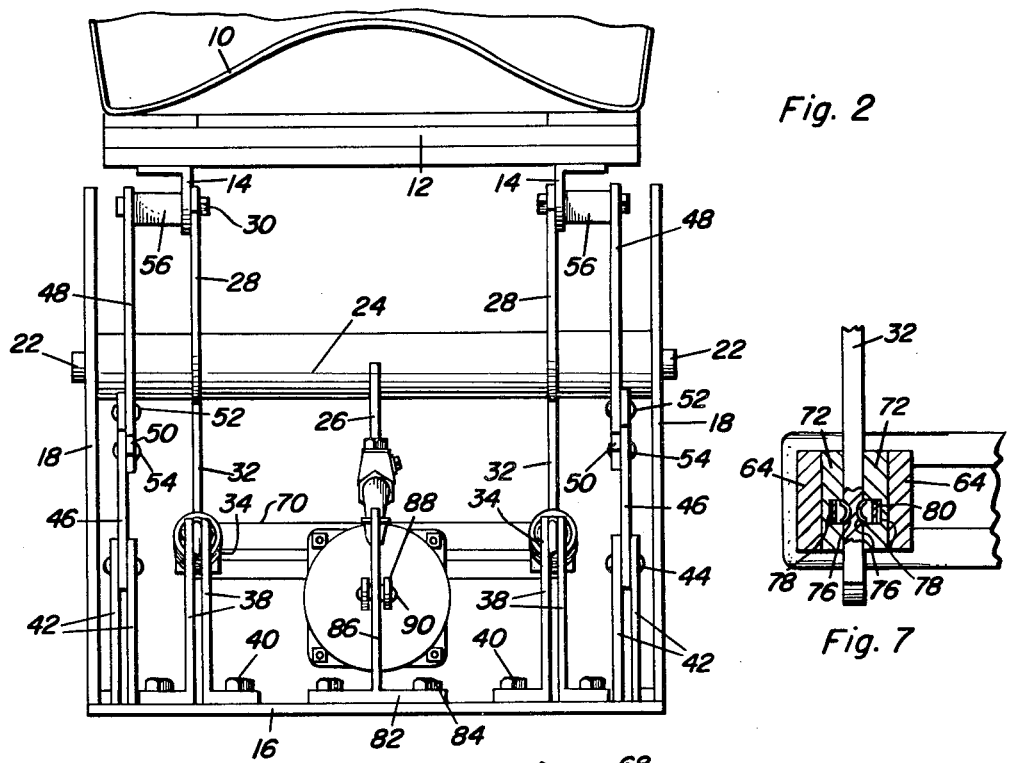
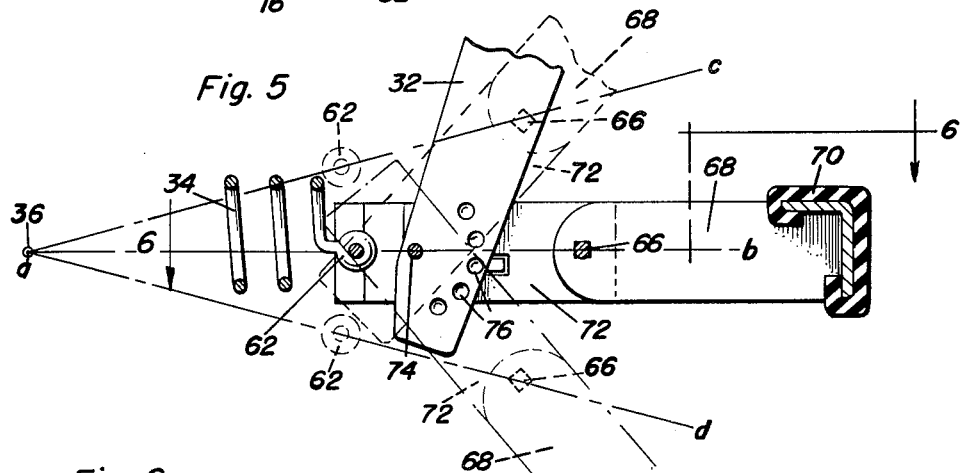
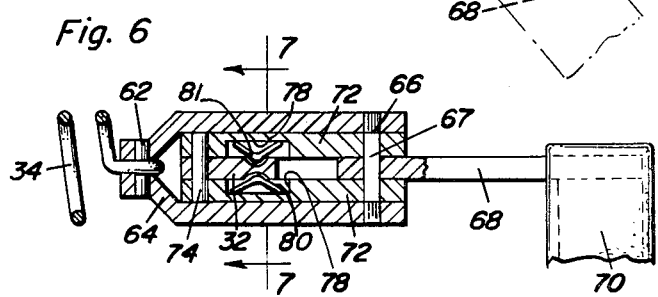

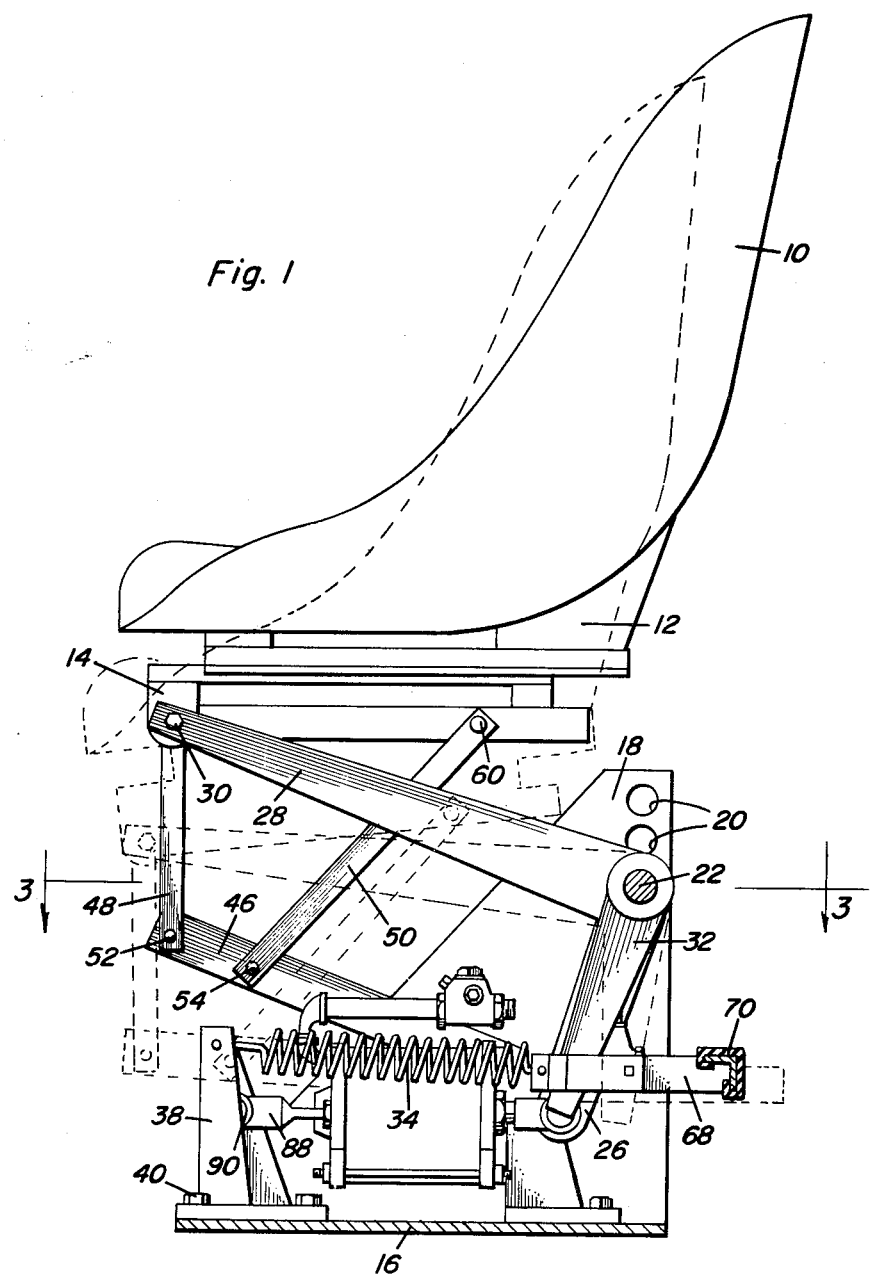

Feb. 8, 1966   J. J. BEOLETTO   3,233,859
RESILIENT MOUNTING FOR VEHICLE OPERATOR'S SEAT
Filed Nov. 16, 1964   3 Sheets-Sheet 3

United States Patent Office 3,233,859
Patented Feb. 8, 1966

3,233,859
RESILIENT MOUNTING FOR VEHICLE OPERATOR'S SEAT
Joseph J. Beoletto, deceased, late of Secor, Ill., by Sandra Beoletto Brubaker, heir and legal representative, 2247 Washington Road, Washington, Ill.
Filed Nov. 16, 1964, Ser. No. 412,594
4 Claims. (Cl. 248—399)

This application constitutes a continuation-in-part of application Ser. No. 214,428, filed Aug. 2, 1962, now abandoned, which in turn is a continuation of application Ser. No. 804,701, filed Apr. 7, 1959.

This invention comprises a novel and useful fluid pressure adjusted vehicle seat mounting unit, and more particularly relates to an adjustable, fluid pressure cushioned mounting for a vehicle seat and especially for the seats of agricultural implements, off-highway vehicles, and the like.

A major problem in the design of off-highway equipment is operator fatigue, occasioned to a large extent by the bouncing and jouncing to which operators are subjected because of the rough terrain over which equipment must be run. Nor is the problem limited to off-highway equipment types. Extremely heavily loaded highway types often present the same or similar problems because of the limited travel of suspension devices necessitated by the very heavy loads carried. Conventional operator seats on such equipment are frequently referred to as "kidney-busters," and the charge is not made in jest. Moreover, the problem is aggravated by the existence of numerous variables, such as roughness of the terrain, speed, operator weight, etc., so that a seat having all the desirable characteristics for one set of variables will probably not be at all right for a situation having a different set of variables.

It is accordingly an object of this invention to provide a mounting for an operator's seat which yields to absorb the shocks caused by rough terrain, and which is adjustable to accommodate to a large variety of conditions including but not limited to the roughness of the terrain traversed, speed of traverse, effectiveness of the vehicle wheel suspension devices, and operator weight.

This and other objects are achieved in a resilient mounting for a vehicle operator's seat of which the details of construction and operation are more fully hereinafter described and claimed, reference being had to the accompanying drawings forming a part hereof, in which:

FIG. 1 is a side elevation view, parts being shown in vertical section of a resilient seat support in accordance with this invention, alternative positions of the same being shown in dotted lines.

FIG. 2 is a front elevational view of the construction of FIG. 1.

FIG. 5 is an enlarged detail view of a portion of the linkage showing an adjusting means for varying the effective force of a spring as applied to the linkage, alternative positions being shown in dotted lines therein.

FIG. 6 is a horizontal sectional detail view taken substantially upon the plane indicated by the section line 6—6 of FIG. 5.

FIG. 7 is a further detail view taken in vertical transverse section substantially upon the plane indicated by the section line 7—7 of FIG. 6.

Figure 3:
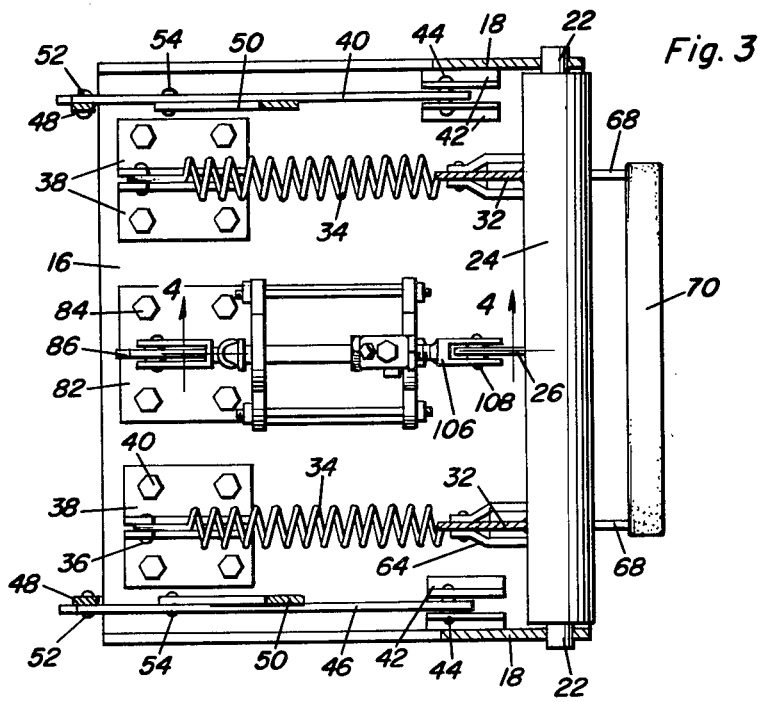
FIG. 3 is a horizontal sectional detail view taken substantially upon the plane indicated by the section line 3—3 of FIG. 1 and showing certain details of the seat supporting and cushioning mechanism.

Referring to the embodiment as shown in FIGS. 1, 2 and 3, it will be observed that a conventional form of bucket seat 10 has a base 12 to the underside of which are secured a pair of angle brackets 14 by means of which the seat is mounted upon a resilient supporting linkage.

Shown at 16 is a base plate having on opposite sides thereof a pair of upstanding brackets or standards 18 in the form of plates which as shown in FIG. 1 are of a generally triangular shape.

Upon its upper portion and adjacent its back edge, each member 18 is provided with a plurality of vertically spaced transversely aligned apertures 20 in which are selectively journaled the pintles 22 of a shaft or axle 24. Rigidly secured to and extending radially from the midportion of the latter is a crank arm 26, while upon the shaft 24 on opposite sides of the crank arm 26 are a pair of lever arms 28 which are pivotally secured as by fasteners or bolts 30 to the previously mentioned brackets 14.

Likewise secured to the axle 24 adjacent the crank levers 28 are depending arms 32 which form substantially a right angle with the members 28. Each set of arms 32 and levers 28 constitutes a bell crank with the axle 24 as its rotational center. The lower ends of the arms 32 are connected by an adjusting mechanism to be hereinafter set forth to one end of each of a pair of tension springs 34, whose other ends are secured to pivot pins 36 carried by pairs of mounting brackeets 38 secured as by bolts 40 to the previously mentioned base member 16. It will thus be apparent that these springs serve yieldingly to rotate the axle 24 in a direction to effect lifting of the arms 28 and of the seat carried thereby towards its uppermost position. The height of the seat at its uppermost and other positions can be regulated by shifting the axle between the vertically spaced apertures 20 in a manner which will readily be understood.

Disposed on the base member 16 outwardly of the brackets 38 is a further set of brackets 42 between which are journaled by pivot pins 44 a pair of links 46 to each of which is pivoted a pair of links 48 and 50 by means of pivot pins 52 and 54 respectively. The upper end of the link 48 is pivotally secured to the previously mentioned fastener 30 with a spacer sleeve 56 being interposed therebetween as shown in FIG. 2. The other link 50 is pivotally secured as at 60 to the base 12 of the chair. It will thus be apparent that the two linkage systems each consisting of the links 46, 48, and 50 serve to support the chair in an approximately level position despite varying inclinations of the levers or links 46.

As so far described, it will now be understood that the axle 24 through the pair of lever arms 28 raises or lowers the seat, with the springs 34 tending to position the seat in its uppermost position, while the linkage system 46, 48, and 50 serves to maintain the seat about level during such movement.

Reference is now made particularly to FIGS. 5–7 for an understanding of an adjustable connection between the springs 34 and the lever arms 32 whereby the effective force of the springs upon the lever arm can be varied at the will of the operator.

One end of each coil spring 34 is secured to the closed end of a yoke or clevis 64 by means of a pin 62. The open end of the clevis 64 rotatably carries a pin 66, which pin has a squared intermediate portion 67. An arm or bar 68 which projects longitudinally from the clevis is mounted on the squared portion 76 of the pin 66. A pair of links 72 are positioned on each side of the arm 68 and are also mounted on the squared portion 67, thus effectively rendering the links 72 and the arm 68 a unitary structure, i.e., links 72 are not movable relative to the arm 68. The other end of the links 72 are pivotally connected by means of a pin 74 to the arm 32. The opposite sides of the arm 32 which extend between the pair of links 72 are provided with recesses 76 which are disposed upon an arc with the pin 74 as the center thereof. A corresponding recess or groove 78 is provided in the adjacent surface of each link 72. A spring clip 80 having a projection or detent 81 thereon is retained within each of the grooves 78. The projections 81 are formed to engage the recesses 76 and to restrain the arm 32 from movement relative to the links 72. The outer ends of the arms 68 are rigidly connected to a cross bar 70 which is positioned directly behind and slightly below the seat 10 within easy reach of the operator seated thereon. Application of an upward or downward force on the cross bar 70 will cause the arm 68 and links 72, acting as a unitary structure, to pivot about the pin 74. The spring force adds to or aids a downward movement of the cross bar 70 and opposes an upward movement thereof. Because of the long moment arm from the pin 74 to the cross bar 70, relative to the distance from the pin 74 to the detents 81, the torque or moment created by a force applied to the cross bar by an operator sitting in the seat will cause the spring clips 80 to flatten out within the grooves 78 and permit the links 72 to assume a different angular relationship with the arm 32. It should be noted at this point, that the line of action of the spring 34 intersects or passes very close to the pin 74 in all positions of the cross bar 70, and thus the spring 34 has a very short moment arm upon which it can act to dislodge the projections 81 from the recesses 76. Such a relationship assures that the projections 81 will remain lodged in the selected recesses 76, regardless of the degree of extension and the force exerted by the spring 34, until the operator again moves the cross bar 70.

What ever the position of the cross bar 70, the line of action or the direction of the force exerted by the spring 34 will always pass through the pin 66. This can be understood because of the pivotal attachment of the clevis 64 to the unitary structure of the arm 68 and the links 72 by the outer ends of the pin 66. Thus, as shown in FIG. 5, with the cross bar 70 raised to its maximum extreme, the line of action of the spring 34 would be from its point of attachment to the brackets 38 by means of the pin 36 to the pin 66, as illustrated by line $a$–$b$. Since the moment arm upon which the spring 34 acts is the normal or perpendicular between the line of action and the center of rotation of the arm 32, it can be seen that the torque applied by a given extension of the spring 34 can be varied considerably by a slight movement of the cross bar 70.

The mechanism thus far described in detail serves to provide a seat for the operator which will yield elastically to absorb shocks due to rough terrain. However, such elastic yielding may in itself present problems in that the seat may bounce due to energy stored in the springs, or the entire structure may constitute a spring system which under some conditions of operation would be subjected to impulses at a resonant frequency, and thus begin to bounce or vibrate through wide amplitudes. To prevent bounce, from whatever cause, means are preferably provided to dampen the oscillations.

In the embodiment of the invention here shown, an adjustable fluid actuated cylinder and piston unit providing a cushioning resistance to downward movement of the seat is connected to the previously mentioned crank arm 26. For this purpose, there is provided a mounting bracket 82 secured to the base plate 16 as by fasteners 84 and from which rises an anchor plate 86. A yoke 88 is pivoted to this plate as by a pivot pin 90, this yoke being rigidly or integrally carried by the outer end of a piston rod 92, to the inner end of which a piston 94 is secured. The piston is slidably received in a cylinder 96 having removable end walls 98 and 100 thereon, wall 98 slidably receiving and journaling, as by a bearing assembly 102, the piston rod 92. Wall 100 is rigidly connected as by a screw threaded engagement with a rod 104, which rod carries a yoke or clevis 106. By means of a pin 108, clevis 106 is pivoted to the previously mentioned crank arm 26.

It will be noted that rods 92 and 104 are disposed in axial alignment with each other and serve to support, for movement with the rods, the cylinder 96 and piston 94.

As so far described, it will be apparent that, as oscillation is imparted to axle 24 by vertical travel of seat 10 through shocks and jars applied thereto during travel of the vehicle on which the seat is mounted, the corresponding oscillating movement of crank arm 32 will be opposed by this cylinder and piston construction.

Extending through piston 94 are a pair of bypass passages 110 and 112. These passages are controlled by oppositely directed check valve assemblies 114 and 116 respectively, these valves being spring closed, as by means of springs 118. The arrangement is such that fluid, such as air, will be trapped within the cylinder on opposite sides of the piston and will yieldingly oppose motion of the piston in the cylinder in either direction; such motion is, however, permitted at a relatively slow rate by check valves 114 and 116. Obviously, the strength of the valve springs may be sufficient, and may readily be adjusted as necessary, to impart any desired resistance to relative motion of the cylinder and piston elements, thereby regulating the retarding or opposing force which the cylinder and piston unit applies to oscillation of shaft 24 and thus to vertical travel of seat 10.

There is also provided at each side of the piston an adjustable valve means for further controlling the escape of air or other fluid from the cylinder, thereby further to regulate the rate of travel of the piston and cylinder units. For this purpose, a pair of conduits 120 and 122 having adjustable check valve assemblies 124 and 126 respectively, communicate with the cylinder at opposite sides of the piston. The two check valve assemblies are identical in construction, and accordingly, illustration of the assembly 124 is sufficient for an understanding of an operation of this portion of the retarding system.

As will be observed, valve assembly 124 has a partition 128 therein provided with a valve port 130 establishing communication with conduit 120 and the atmosphere through a metering conduit 132. A flat valve 134 is pivoted as at 136 and controls opening 130, by moving either toward or from that opening. An adjustable stop comprising a screw 138 is employed to regulate the amount of travel of valve 134, which is provided with an axial bore 140 therethrough of a limited size to constitute a fixed bleed through the port when the valve is closed. Obviously, with this type of valve construction, the valve may open to permit the inflow of fluid through the conduits 120 and 122 into the cylinder 96, but when closed, as by pressure applied thereto by movement of piston 94 in a particular direction, restricts the escape of fluid by means of bore 140.

These valve means obviously provide means, which may be readily adjustable manually, to facilitate the regulating and adjusting of the resistance imparted by the cylinder and piston unit to vertical movement of seat 10, thereby cushioning or damping vibration of the seat.

Figure 4:
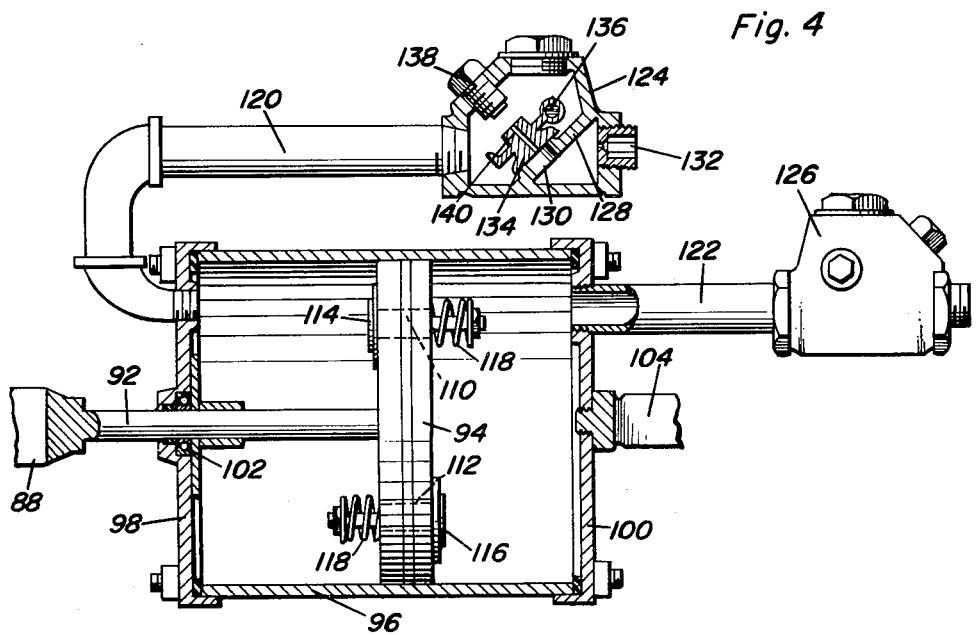
FIG. 4 is a vertical longitudinal sectional view taken upon an enlarged scale substantially upon the plane indicated by the section line 4—4 of FIG. 3.

Obviously, other types of dampers may be substituted for or used in conjunction with the embodiment shown in FIG. 4, including pneumatic as well as hydraulic dampers, such as shown in Patent 2,892,482, issued June 30, 1959, for example.

It should be noted that there are two springs 34, as best shown in FIG. 3, which resist downward movement of the seat 10. These springs are spaced apart laterally and serve an additional function because of their number and spacing. It is obvious, that the oscillations in the various supporting links are numerous when rough terrain is encountered and wearing of the pivotal pins connecting these links is rapid and considerable. By utilizing two springs spaced apart, the seat 10 tends to maintain an even or level attitude even though the pivotal connections may become worn. In those seat suspensions which utilize a single spring, be it a tension or compression spring, wear in the pivotal connections permits the spring to become misaligned with reference to the centerline of the seat. The line of action or direction of force exerted by a single spring so misaligned introduces another moment or torque which tends to tip the seat to one side. With the present invention, the seat will remain level, i.e., it will not tip to one side or the other due to the spring force, even though the pivotal connections become badly worn. To further assure that the seat remains free of lateral side movement, the seat 10 is supported by three different sets of links, i.e., lever arms 28, and links 48 and 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed is:

1. A resilient support for a vehicle seat comprising:
a supporting base,
an axle journaled on said base,
a lever attached to the axle and pivotally connected to said sheet,
a stabilizing and control linkage pivotally connected between said base and said seat,
an arm secured to the axle,
spring means pivotally secured at one end to said base,
a yoke pivotally attached to the other end of the spring means,
link means pivotally mounted on the yoke,
pin means pivotally connecting the arm to the link means at a point intermediate said attachment of the yoke and spring means and said mounting of the yoke and link means,
and detent means for selective positioning of the arm relative to the link means to thereby change the moment arm upon which the spring means acts.

2. A resilient support for a vehicle seat comprising:
a supporting base for mounting on the vehicle,
a stabilizing and control linkage pivotally connected between said base and seat,
an axle rotatably supported from said base,
a pair of bell cranks secured to, and axially spaced on, the axle, each of said cranks having
 (a) a lever pivotally attached to the seat, and
 (b) an arm,
a pair of springs pivotally mounted on said base,
a pair of adjustment means connecting each spring to one of the arms, each of said means having
 (a) a link pivotally secured to the arm,
 (b) a yoke pivotally connected at one end to the spring and at the other end to the link at an intermediate point thereof, and
 (c) detent means interposed between the link and arm for adjustably maintaining the angularity therebetween, and
bar means secured to the free ends of the links for simultaneous adjustment of the pair of adjustment means.

3. A resilient support according to claim 1 wherein the detent means are positioned relatively close to the pin means and said intermediate point is approximately in the middle of the link means.

4. A resilient support according to claim 2 wherein the detent means are positioned relatively close to the pivoted securement of arm and link and said intermediate point is approximately half way between the bar means and the pivotal connection of the arm and link.

References Cited by the Examiner

UNITED STATES PATENTS

| | | | |
|---|---|---|---|
| 1,099,073 | 6/1914 | Moir | 267—8 |
| 1,226,673 | 5/1917 | Kane | 188—88 |
| 2,606,592 | 8/1952 | McIntyre | 248—374 |
| 2,690,786 | 10/1954 | Sedlock | 248—378 |
| 2,714,001 | 7/1955 | Hersey | 248—400 |
| 2,760,552 | 8/1956 | Decker | 248—404 |
| 2,829,703 | 4/1958 | Knoedler | 248—378 |
| 2,869,685 | 1/1959 | Funkhouser | 248—378 |
| 3,006,593 | 10/1961 | Plate | 248—376 |

CLAUDE A. LE ROY, *Primary Examiner.*

FRANK L. ABBOTT, *Examiner.*

UNITED STATES PATENT OFFICE
CERTIFICATE OF CORRECTION

Patent No. 3,233,859                          February 8, 1966
   Joseph J. Beoletto, deceased, by Sandra Beoletto
     Brubaker, heir and legal representative It is hereby certified that error appears in the above numbered patent requiring correction and that the said Letters Patent should read as corrected below.

Column 5, line 25, for "sheet" read -- seat --.

Signed and sealed this 10th day of January 1967.

(SEAL)
Attest:

ERNEST W. SWIDER                                   EDWARD J. BRENNER
Attesting Officer                                           Commissioner of Patents